(12) United States Patent
Tomatsu

(10) Patent No.: US 7,346,371 B2
(45) Date of Patent: Mar. 18, 2008

(54) PORTABLE TERMINAL DEVICE

(75) Inventor: Ken Tomatsu, Yokohama (JP)

(73) Assignee: Kyocera Corporation, Kyoto (JP)

( * ) Notice: Subject to any disclaimer, the term of this patent is extended or adjusted under 35 U.S.C. 154(b) by 220 days.

(21) Appl. No.: 10/831,853

(22) Filed: Apr. 26, 2004

(65) Prior Publication Data

US 2004/0214531 A1 Oct. 28, 2004

(30) Foreign Application Priority Data

Apr. 28, 2003 (JP) .............................. 2003-123584

(51) Int. Cl.
*H04B 1/38* (2006.01)

(52) U.S. Cl. ................. 455/558; 455/575.1; 455/575.3; 455/575.4; 455/95; 455/559; 439/630; 439/926; 439/945; 439/331; 439/327

(58) Field of Classification Search ............. 455/575.1, 455/575.3, 575.4, 575.8, 95, 558, 559; 439/630, 439/926, 945, 331, 327
See application file for complete search history.

(56) References Cited

U.S. PATENT DOCUMENTS

| | | | | |
|---|---|---|---|---|
| 5,933,328 | A * | 8/1999 | Wallace et al. | ............. 361/737 |
| 5,946,635 | A * | 8/1999 | Dominguez | ................. 455/558 |
| 6,226,189 | B1 * | 5/2001 | Haffenden et al. | .......... 361/814 |
| 6,343,018 | B1 * | 1/2002 | Takeyama et al. | .......... 361/737 |
| 6,397,081 | B1 * | 5/2002 | Franck et al. | ................ 455/558 |
| 6,623,304 | B2 | 9/2003 | Harasawa et al. | |
| 2002/0002061 | A1 * | 1/2002 | Miyasaka et al. | ........... 455/557 |
| 2003/0064758 | A1 | 4/2003 | Mizuta et al. | |
| 2004/0203532 | A1 * | 10/2004 | Mizuta | ...................... 455/90.3 |
| 2005/0158617 | A1 * | 7/2005 | Satoh et al. | .................. 429/96 |

FOREIGN PATENT DOCUMENTS

| | | |
|---|---|---|
| CN | 1311614 A | 9/2001 |
| CN | 1375974 A | 10/2002 |
| CN | 1411253 A | 4/2003 |
| CN | 200410036991.5 | 4/2003 |
| JP | 2002-032715 | 1/2002 |

OTHER PUBLICATIONS

Chinese language office action and its English translation for corresponding Chinese application No. 200410036991.5 lists the reference above.

* cited by examiner

*Primary Examiner*—Rafael Perez-Gutierrez
*Assistant Examiner*—Khai Nguyen
(74) *Attorney, Agent, or Firm*—Hogan & Hartson LLP

(57) ABSTRACT

A portable terminal device includes a first body having an operation section on a main surface thereof, a second body having a display section on a main surface thereof, a connection device for connecting the first body and the second body so that the portable terminal device is openable and closable, a memory storage section having an opening section openable to another main surface of the second body, a lid for opening and closing the opening section and retaining a removable memory in the memory storage section, wherein the operation section is covered by the second body when the portable terminal device is in a closed state, and is exposed to the outside when the portable terminal device is in an open state, and the display section is exposed to the outside in either the closed or opened state.

10 Claims, 4 Drawing Sheets

FIG. 1A
FIG. 1B
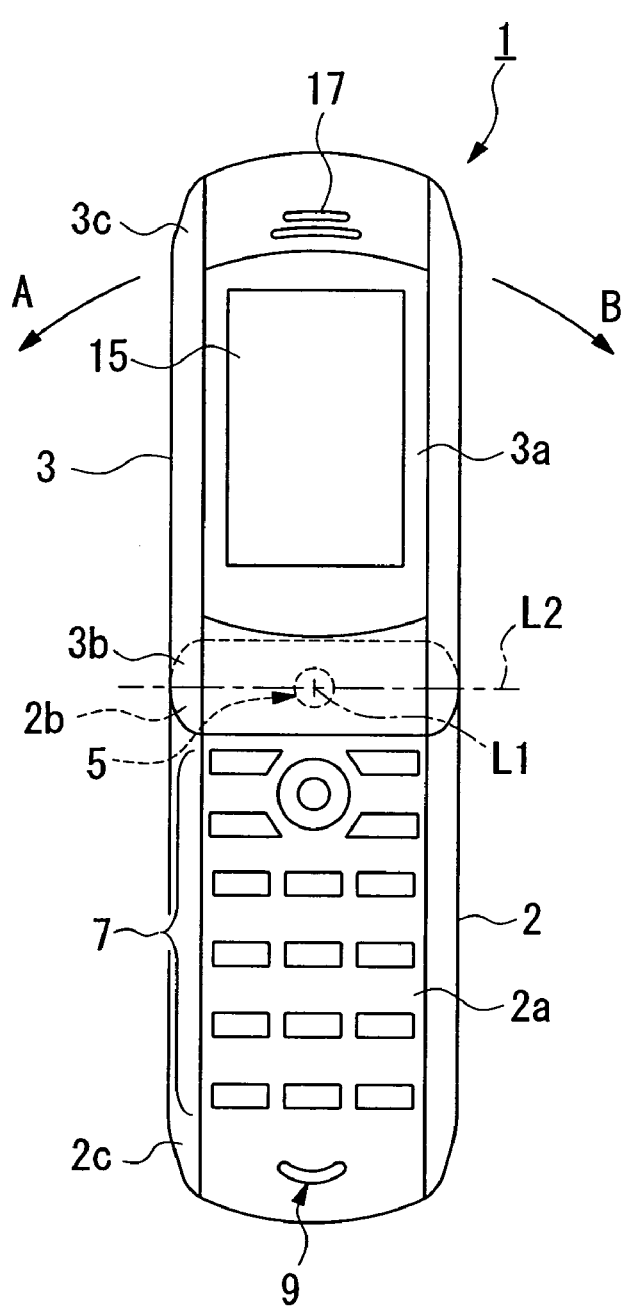
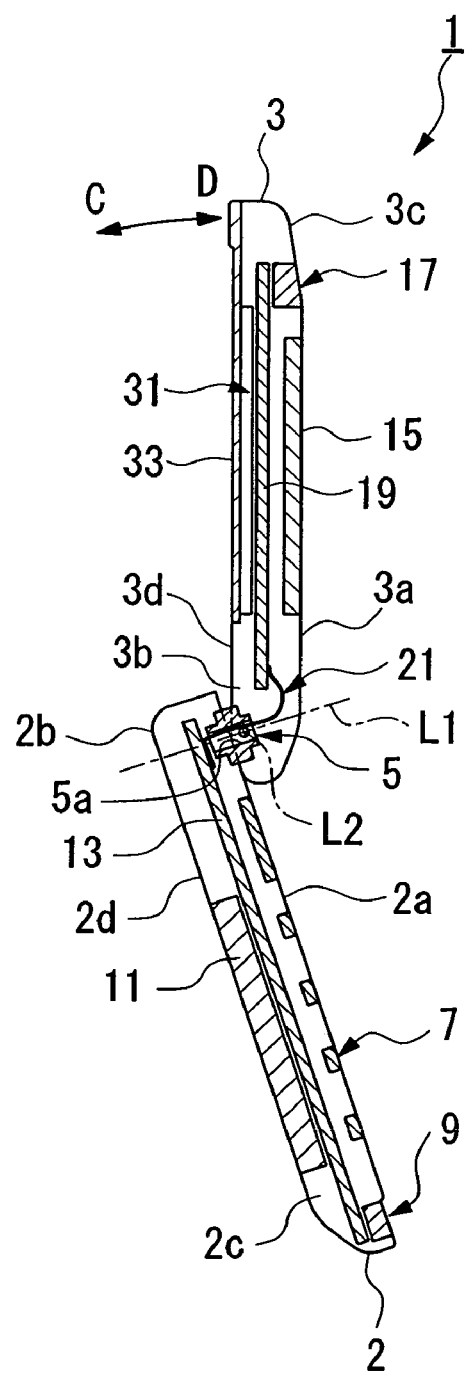

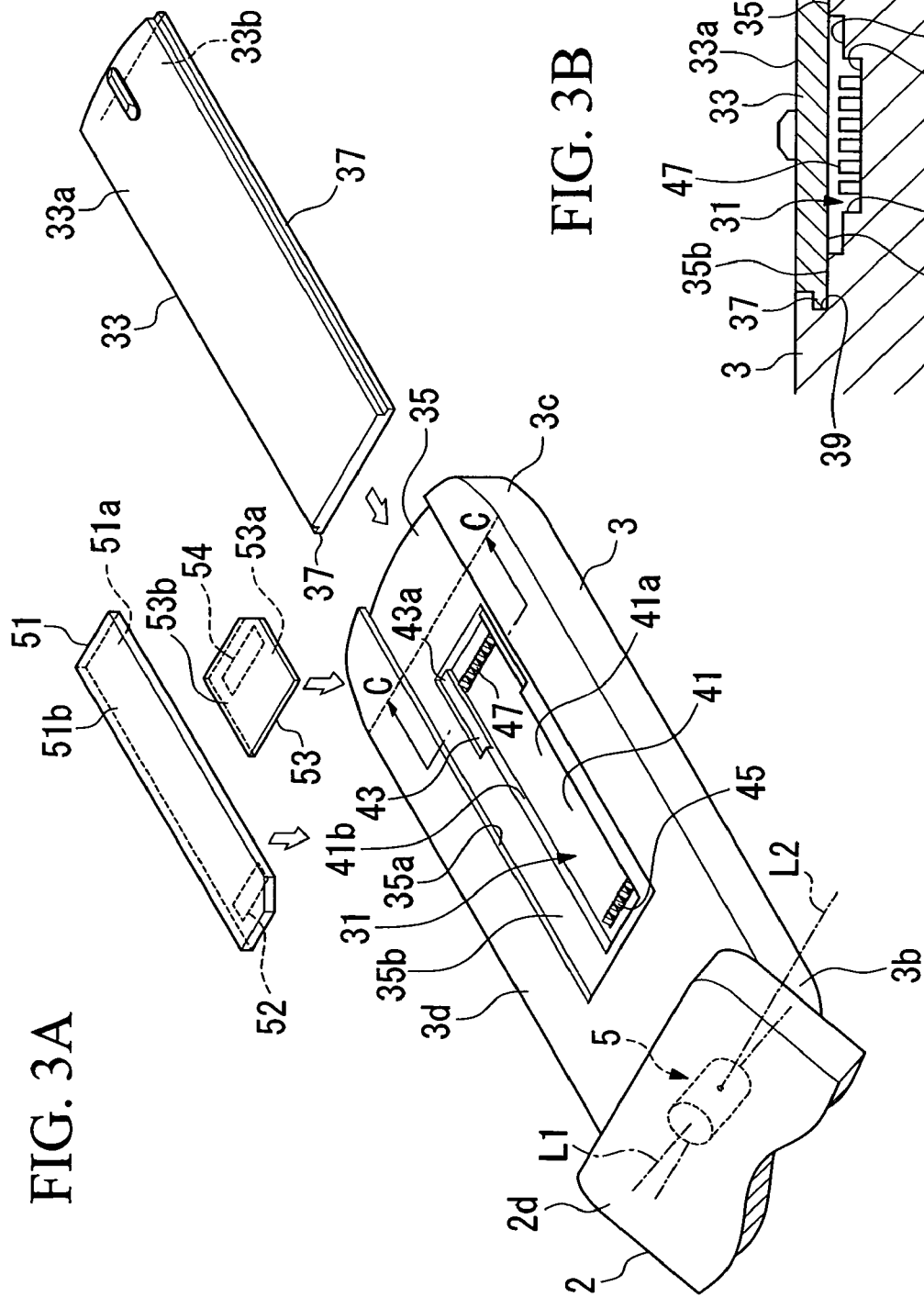
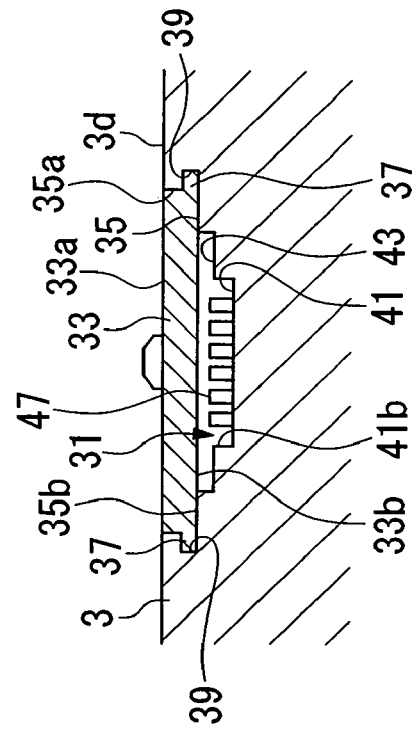
FIG. 3A
FIG. 3B

PORTABLE TERMINAL DEVICE

BACKGROUND OF THE INVENTION

1. Field of the Invention

This invention relates to a portable terminal device, such as a mobile telephone, personal digital assistants (PDA), and the like, which can store a thinly-formed removable memory.

Priority is claimed on Japanese Patent Application No. 2003-123584, filed Apr. 28, 2003, the content of which is incorporated herein by reference.

2. Description of Related Art

Conventionally, as is shown, for example, in Japanese Unexamined Patent Application, First Publication No. 2002-32715, a portable terminal device for storing a thinly-formed removable memory has slots for inserting the memory along its side faces parallel to the thickness of its body. When mounting a removable memory onto this portable terminal device, the removable memory is fitted into the slots and stored inside the body. This allows data to be transmitted between the portable terminal device and the removable memory.

Portable terminal devices are generally required to be small and thin, since they are to be carried inside bags, coat pockets, and such like.

However, in conventional portable terminal devices such as the above, a mechanism for holding the removable memory inside the body increases the thickness of the body, and runs counter to the demand for making the device thin. Furthermore, since the insert holes of the slots are exposed to the outside at all times, there is a risk that the removable memory will fall out as the result of a blow from the outside while the portable terminal device is being used or carried.

This invention has been realized after consideration of the above problems, and aims to provide a portable terminal device, which has a thin body and can prevent the removable memory from falling out.

SUMMARY OF THE INVENTION

The aspect of the present invention is a portable terminal device including a first body having an operation section on a main surface thereof, a second body having a display section on a main surface thereof, a connection device for connecting the first body and the second body so that the portable terminal device is openable and closable, a memory storage section having an opening section openable to another main surface of the second body, a lid for opening and closing the opening section and retaining a removable memory in the memory storage section, wherein the operation section is covered by the second body when the portable terminal device is in a closed state, and is exposed to the outside when the portable terminal device is in an open state, and the display section is exposed to the outside in either the closed or opened state.

According to the portable terminal device of this invention, when attaching the removable memory in the memory storage section, the two bodies are opened and another main face of the second body is exposed to the outside, and the lid is removed so that the memory storage section is open to the outside. Thereafter, the removable memory is stored in the memory storage section, which is then closed by using the lid.

When the two bodies are mutually overlapped into the closed state, the lid and the memory storage section, provided on the other main face of the second body, are covered and hidden by the first body and are not exposed to the outside; this prevents the removable memory from falling out as the result of a blow from the outside. Furthermore, since the mechanism for holding the removable memory in the second body is comprised of the lid and the first body, the mechanism can be simplified, making it possible to limit any increase in the thickness of the second body caused by forming the memory storage section.

When the two bodies are in the open state, the display section and the operation section provided on main faces of the two bodies can be visually confirmed simultaneously, so that the other main faces of the two bodies do not need to be visually confirmed. Therefore, the external design is not spoiled by providing the memory storage section in other main faces of the bodies.

In this invention, the "main face" of the body is the top face having the largest area of the top faces forming the body, and the "other main face" of the body is the main face having the next largest area after the main face.

In the portable terminal device described in the aspect, the memory storage section includes a plurality of storage spaces for respectively storing a plurality of types of removable memories having different shapes.

According to the portable terminal device of this invention, removable memories having a plurality of stipulations can be mounted in the portable terminal device, enabling them to be selectively used as necessary, and allowing data to be transmitted easily between the portable terminal device and another terminal device. For example, when using the removable memory to transmit various types of data between the portable terminal device and another terminal device, the stipulations of the removable memory can be selected to match those of one that can be attached to the other terminal device.

In the portable terminal device described in the aspect, at least one portion of the plurality of storage spaces is formed to be mutually overlapping.

According to the portable terminal device of this invention, when changing from a state where an removable memory of a given stipulation is stored in the memory storage section to a state where an removable memory of a different stipulation is stored in the memory storage section, the removable memory of the given stipulation is removed from the memory storage section, and the removable memory of the different stipulation is stored in the memory storage section thereafter. In this way, a plurality of storage spaces for storing removable memories of various stipulations can be mutually overlapped, enabling the capacity of the memory storage section to be reduced, and thereby enabling the portable terminal device to be made smaller.

In the portable terminal device described in the aspect, another main surface of the second body may be flush with an outside surface of the lid when the opening section of the memory storage section is closed by the lid.

In the portable terminal device described in the aspect, the lid may be inserted into and removed from the memory storage section by sliding the lid.

In the portable terminal device described in the aspect, the portable terminal device may be a mobile radiotelephone.

In the portable terminal device described in the aspect, the portable terminal device may be a personal digital assistant.

In the portable terminal device described in the aspect, the closed state is a state in which the first body and the second body are stacked one on the other, the opened state is a state in which the operation section is exposed to the outside, the connecting device includes an axial line along a direction in which the first and second bodies are stacked, and the state of the portable terminal device may be changed from the closed state to the opened state by rotating one of the first and second bodies with respect to the other about the axial line.

In the portable terminal device described in the aspect, the closed state is a state in which the first body and the second body are stacked one on the other, the opened state is a state in which the operation section is exposed to the outside, and the state of the portable terminal device may be changed from the closed state to the opened state by sliding the second body with respect to the first body.

BRIEF DESCRIPTION OF THE DRAWINGS

FIGS. 1A and 1B are diagrams showing a mobile telephone according to an embodiment of this invention wherein first and second bodies are in an open state, FIG. 1A showing a schematic plan view, and FIG. 1B showing a schematic cross-sectional view.

FIG. 3A is a perspective view of a state prior to storing a first or second removable memory in a memory storage section, and FIG. 3B is a cross-sectional view taken along the line C-C of FIG. 3A, showing the state when a lid has been attached, in the mobile telephone shown in FIGS. 1A and 1B.

DETAILED DESCRIPTION OF THE INVENTION

Figure 2A:
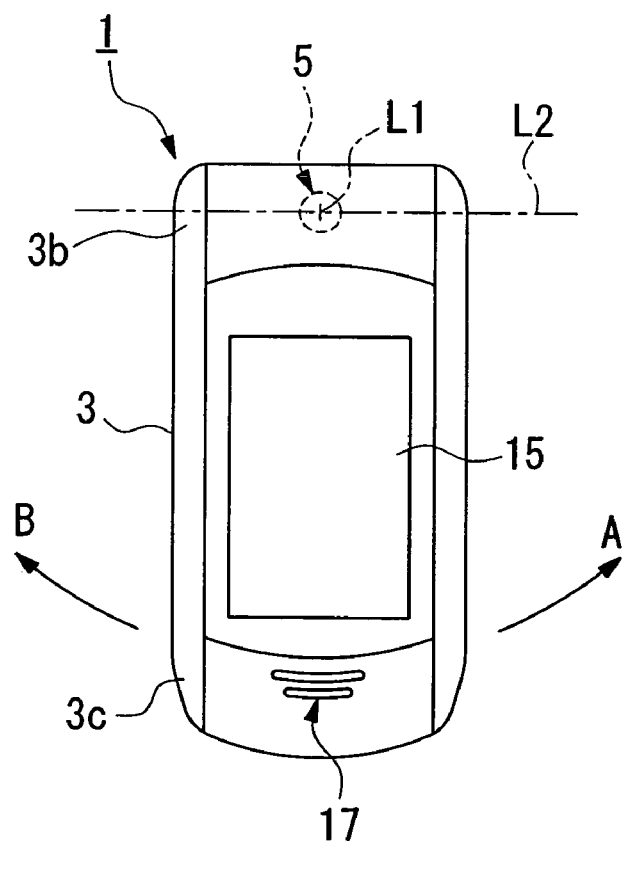
FIGS. 2A and 2B are diagrams showing a mobile telephone according to an embodiment of this invention wherein first and second bodies are in a closed state, FIG. 2A showing a schematic plan view, and FIG. 2B showing a schematic cross-sectional view.

FIGS. 1 to 5 show a preferred embodiment of the invention, applied in a mobile telephone.

As shown in FIGS. 1A and 1B, the mobile telephone (portable terminal device) 1 according to this embodiment, includes a first body 2, a second body 3 that can be overlapped parallel to the first body 2, and a connection device 5 that is capable of (i) rotating the first and second bodies 2 and 3 in a direction AB around a first axial line (reference axial line) L1, which runs perpendicularly through the first and second bodies 2 and 3, and (ii) mutually sliding them in a direction CD around a second axial line L2, which intersects the first axial line L1 at a right angle. The connection device 5 connects end sections 2b and 3b (hereinafter termed base sections 2b and 3b) of the two bodies 2 and 3.

An operation section 7 includes various types of control keys, such as a call key, an end-call key, ten keys and the like, and is provided in one main face 2a of the first body 2 facing the first axial line L1 direction. A microphone section 9 is provided at a tip section 2c of the main face 2a of the first body 2 on the opposite side of the base section 2b. The operation section 7 and the microphone section 9 are covered by the second body 3, when the first and second bodies 2 and 3 overlap each other in the closed state.

A battery 11 and a first circuit board 13 are arranged inside the first body 2. The battery 11 supplies electrical power needed to operate the mobile telephone 1, and can be freely attached to and detached from the other main face 2d of the first body 2 on the opposite side of the main face 2a. The battery 11 is electrically connected to the first circuit board 13. The first circuit board 13 electrically connects the operation section 7 and the microphone section 9. Various unillustrated electronic components for controlling various functions, such as calling and mailing, are mounted on the first circuit board 13.

Figure 2B:
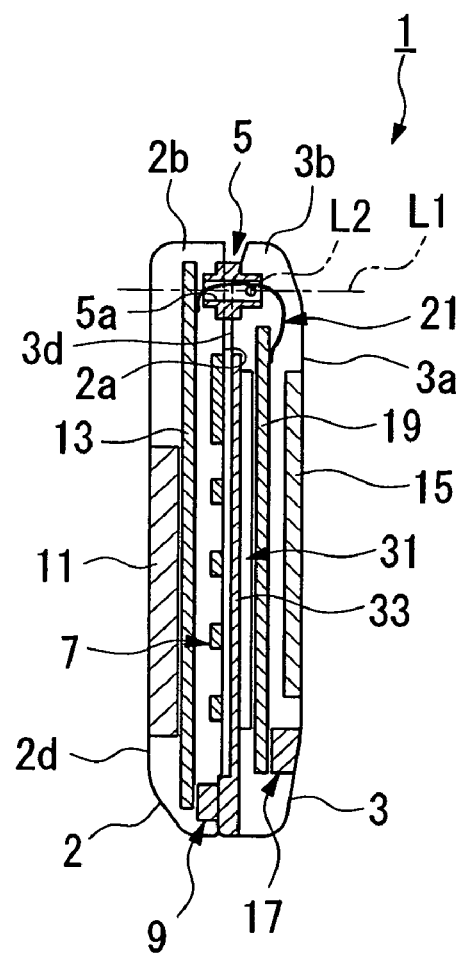

A display section 15 for displaying various information is provided in the one main face 3a of the second body 3 facing in the same direction as the main face 2a of the first body 2. A speaker section 17 is used together with the microphone section 9 when making telephone calls, and is provided at a tip section (other end section) 3c of the main face 3a of the second body 3 on the opposite side of the base section 3b. As shown in FIGS. 2A and 2B, when the two bodies 2 and 3 are rotated by 180° around the first axial line L1 from the open state so that they are overlapped in the closed state, the display section 15 and the speaker section 17 are exposed to the outside.

The display section 15 and the speaker section 17 are electrically connected to a second circuit board 19, provided inside the second body 3. Various unillustrated electronic components for controlling various functions are mounted on the second circuit board 19 in the same manner as the first circuit board 13.

The first and second circuit boards 13 and 19 in the bodies 2 and 3 are electrically connected to each other by a plurality of cables 21, via a connection through-hole 5a of the connection device 5, connecting the internal spaces of the two bodies 2 and 3. The cables 21 transmit data in the form of electrical signals between the two circuit boards 13 and 19, and supply power from the battery 11 via the first and second circuit boards 13 and 19 to the display section 15, the speaker section 17, and the various electronic components.

A memory storage section 31 having an opening section to other main face 3d, and a lid 33 for closing the opening section of the memory storage section 31, are provided in another main face 3d of the second body 3 on the opposite side to the main face 3a.

As shown in FIGS. 3A and 3B, the lid 33 has the shape of a thin sheet that is approximately rectangular in plan view, and can be buried in a cavity 35, which is approximately rectangular in plan view, the cavity 35 being obtained by forming a depression in the thickness direction from the main face 3d of the second body 3. The thickness of the lid 33 is equal to the depth of the cavity 35, and, when the lid 33 is inserted into cavity 35, the upper face 33a of the lid 33 exposed to the outside forms a single flat face with the main face 3d of the second body 3.

The lid 33 slides into the cavity 35 from the tip section 3c of the second body 3 toward the base section 3b side. The lid 33 has protruding sections 37 that protrude from both its sides in the direction of its width. In addition, tracks 39 that interlock with the protruding sections 37 of the lid 33 are provided in side wall faces 35a of the cavity 35, and run along the long sides of the second body 3; the lid 33 can be moved parallel to the direction of these tracks 39.

Incidentally, when the protruding sections 37 are interlocked with the tracks 39, the lid 33 cannot move in the direction of the thickness of the second body 3. In this state, a lower face 33b in the thickness direction of the lid 33 directly contacts a bottom face 35b of the cavity 35.

The memory storage section 31 stores switchable first and second removable (external) memories 51 and 53, which transmit data to and from the mobile telephone 1, and has first and second cavities 41 and 43, obtained by forming further depressions from the bottom face 35b of the cavity 35 in the direction of the thickness of the second body 3.

The first and second removable memories 51 and 53 have mutually different shapes. The first removable memory 51 has the shape of a thin sheet that is approximately rectangular in plan view, a connection terminal 52 for electrically connecting the first removable memory 51 to the mobile telephone 1 being provided on an upper face 51a in the thickness direction. The second removable memory 53 has the shape of a thin sheet that is approximately square in plan view, and, as in the first removable memory 51, a connection terminal 54 for electrically connecting the second removable memory 53 to the mobile telephone 1 is provided on an upper face 53a in the thickness direction.

The first removable memory 51 is longer and thicker than the second removable memory 53, but the second removable memory 53 is wider than the first removable memory 51.

The first cavity 41 stores the first removable memory 51, and is approximately rectangular in plan view. The length of the first cavity 41 along the long side of the second body 3, and the width of the first cavity 41 along the width of the second body 3 intersecting the long direction at a right angle, approximately match the respective length and width of the first removable memory 51. Therefore, when the first removable memory 51 is stored in the first cavity 41, the first removable memory 51 cannot move with respect to the second body 3 in the direction along the main side 3d thereof.

Figure 4:
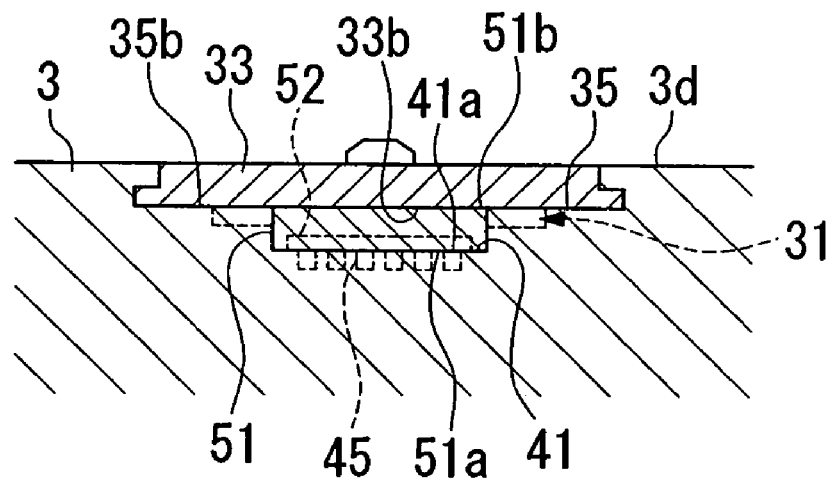
FIG. 4 is an enlarged cross-sectional view of the state when a first removable memory is stored in the memory storage section in the mobile telephone shown in FIGS. 1A and 1B.

The depth from the bottom face 35b of the cavity 35 to the bottom face 41a of the first cavity 41 approximately matches the thickness of the first removable memory 51. Therefore, as shown in FIG. 4, when the upper face 51a of the first removable memory 51 is directly contacted against the bottom face 41a of the first cavity 41, the lower face 51b of the first removable memory 51 forms an approximately flat face with the bottom face 35b of the cavity 35.

The first cavity 41 forms a storage space for storing the first removable memory 51.

As shown in FIGS. 3A and 3B, the second cavity 43 stores the second removable memory 53, and is approximately square in plan view. That is, the length and width of the second cavity 43 approximately match those of the second removable memory 53, and, as in the case of the first removable memory 51, when the second removable memory 53 is stored in the second cavity 43, the second removable memory 53 cannot move with respect to the second body 3 in the direction along the main face 3d.

Figure 5:
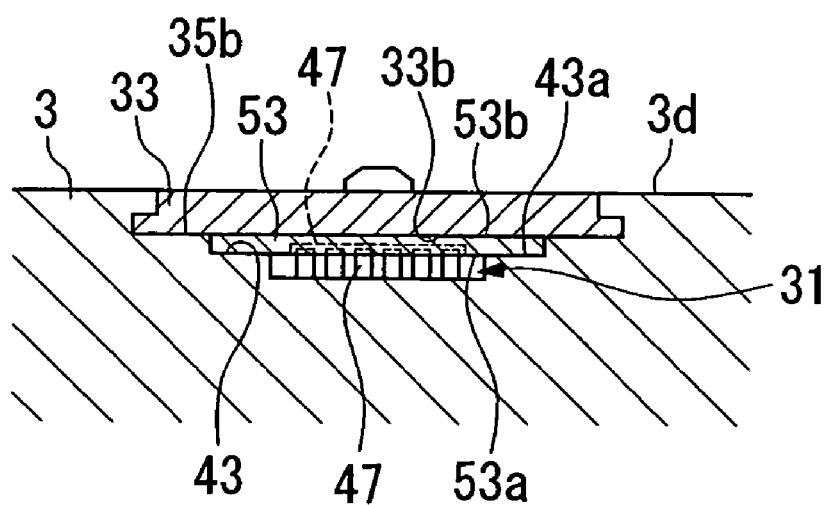
FIG. 5 is an enlarged cross-sectional view of the state when a second removable memory is stored in the memory storage section in the mobile telephone shown in FIGS. 1A and 1B.

The depth from the bottom face 35b of the cavity 35 to the bottom face 43a of the second cavity 43 approximately matches the thickness of the second removable memory 53. Therefore, as shown in FIG. 5, when the upper face 53a of the second removable memory 53 is directly contacted against the bottom face 43a of the second cavity 43, the lower face 53b of the second removable memory 53 forms an approximately flat face with the bottom face 35b of the cavity 35.

The second cavity 43 forms a storage space for storing the second removable memory 53.

As shown in FIGS. 3A and 3B, the storage spaces for storing the first and second removable memories 51 and 53 partially overlap each other. That is, the part of the storage space for the first removable memory 51 that is positioned at the tip section 3c of the second body 3 overlaps with the part of the storage space of the second removable memory 53 that is positioned in the center of the width direction of the second body 3. Therefore, the second cavity 43 actually includes a pair of steps, extending toward the outside from the sidewall faces 41b of the part of the first cavity 41 that is positioned at the tip section 3c of the second body 3.

An outside connection terminal 45 protrudes from the bottom face 41a of the first cavity 41 at the base section 3b of the second body 3, and electrically connects to the connection terminal 52 of the first removable memory 51. When the first removable memory 51 is stored in the first cavity 41, the outside connection terminal 45 is pushed into contact by the first removable memory 51.

An outside connection terminal 47 protrudes from the bottom face 41a of the first cavity 41 at the tip section 3c of the second body 3, and electrically connects to the connection terminal 54 of the second removable memory 53. When the second removable memory 53 is stored in the second cavity 43, the outside connection terminal 47 is pushed into contact by the second removable memory 53.

The two outside connection terminals 45 and 47 elastically deform when pressed in the direction of the thickness of the second body 3, allowing them to be fitted inside the second body 3.

As shown in FIGS. 2A and 2B, when the two bodies 2 and 3 described above are overlapped together in the closed state, a small gap is formed between the main face 2a of the first body 2 and the main face 3d of the second body 3. This prevents damage to the operation section 7 caused when the second body 3 rubs the main face 2a at the time of opening and closing the two bodies 2 and 3 around the first axial line L1.

A method for attaching and detaching the first and second removable memories 51 and 53 to/from the mobile telephone 1 having the above constitution will be explained.

When attaching the first removable memory 51 to the mobile telephone 1, for example, starting from the closed state where the bodies 2 and 3 overlap each other as shown in FIGS. 2A and 2B, the second body 3 is rotated 180° around the first axial line L1 with respect to the first body 2 as shown in FIGS. 1A and 1B, thereby mutually opening the two bodies 2 and 3 and exposing the main face 3d of the second body 3 to the outside. Then, as shown in FIGS. 3A and 3B, the lid 33 is removed by moving it in the long direction of the second body 3, exposing the memory storage section 31 to the outside.

Next, as shown in FIG. 4, the first removable memory 51 is stored in the first cavity 41, and the lid 33 is attached to close the opening section of the memory storage section 31. In this state, the upper face 51a and lower face 51b of the first removable memory 51 directly contact the bottom face 41a of the first cavity 41 and the lower face 33b of the lid 33 respectively, and the outside connection terminal 45 touches the connection terminal 52 of the first removable memory 51. Consequently, the mobile telephone 1 and the first removable memory 51 become electrically connected, and data can be transmitted between them.

When replacing the first removable memory 51 stored in the first cavity 41 with the differently shaped second removable memory 53, the lid 33 is removed with the two bodies 2 and 3 in the open state as shown in FIG. 3A, and the first removable memory 51 is removed from the first cavity 41. Thereafter, as shown in FIG. 5, the second removable memory 53 is stored in the second cavity 43, and the opening section of the memory storage section 31 is closed by the lid 33.

In this state, the upper face 53a and the lower face 53b of the second removable memory 53 directly contact the bottom face 43a of the second cavity 43 and the lower face 33b of the lid 33 respectively, and the outside connection terminal 47 touches the connection terminal 54 of the second removable memory 53. Consequently, the mobile telephone 1 and the second removable memory 53 become electrically connected, enabling data to be transmitted between them.

When the mobile telephone 1 is carried in a bag or a coat pocket, the two bodies 2 and 3 are overlapped into the closed state shown in FIGS. 2A and 2B. In this state, since the display section 15 is exposed to the outside, various data displayed on the display section 15 can be visually confirmed without rotating and opening the bodies 2 and 3. Furthermore, since neither the lid 33 nor the memory storage section 31 provided in the main face 3d of the second body 3 are exposed to the outside in the closed state, there is no danger that the first removable memory 51 (or the second removable memory 53) stored in the memory storage section 31 will fall out as the result of a blow from the outside.

When operating the operation section 7 in the mobile telephone 1, as shown in FIGS. 1A and 1B, the second body 3 is rotated 180° around the first axial line L1 with respect to the first body 2, mutually opening the two bodies 2 and 3. In this state, since the main faces 2a and 3a of the two bodies 2 and 3 are facing in approximately the same direction, the operation section 7 and the display section 15 provided on these main faces 2a and 3a can be visually confirmed simultaneously. Since only the main faces 2a and 3a of the first and second bodies 2 and 3 are visually confirmed, the other main faces 2d and 3d are not visually confirmed at this time.

As described above, according to the mobile telephone 1, since the memory storage section 31 is covered and hidden by overlapping the two bodies 2 and 3, the removable memory can be easily prevented from falling out.

Since the structure for preventing the first removable memory 51 or the second removable memory 53 from falling out is achieved merely by the lid 33 and the first body 2 forming the mobile telephone 1, it is possible to limit increase in the thickness of the second body 3 and thereby make the mobile telephone 1 thinner.

Furthermore, since the two removable memories 51 and 53 having different shapes can be mounted in the mobile telephone 1, each can be selected as necessary, making it easy to transmit data with another terminal device, such as a personal computer. For example, when using the removable memories 51 and 53 to transmit various kinds of data to and from another terminal device, it is possible to select the one (of the two removable memories 51 and 53) that can be attached to the other terminal device.

Since two types of removable memories 51 and 53 having different stipulations are mutually overlapped in part of storage spaces for storing them, the capacity of the memory storage section 31 can be reduced, making the mobile telephone 1 smaller.

When the two bodies 2 and 3 are rotated into the open state, the operation section 7 and the display section 15 that are provided in the main faces 2a and 3a of the two bodies 2 and 3 can be visually confirmed simultaneously, so there is no need to visually confirm the main face 3d of the second body 3 in this state. Furthermore, when the two bodies 2 and 3 are overlapped into the closed state, the main face 3d of the second body 3 is covered and hidden by the first body 2, so the superior external design of the mobile telephone 1 can be maintained even when the memory storage section 31 is formed opening to the main face 3d of the second body 3.

In the embodiment described above, the lid 33 is attached by sliding, but the constitution is not restricted to this, it being necessary only that the opening section of the memory storage section 31 can be closed and kept in a closed state.

The two storage spaces for storing the first and second removable memories 51 and 53 are formed to be mutually overlapping, but they may be formed to be mutually independent in the case where making the second body 3 smaller is not a consideration. In other words, the first and second cavities 41 and 43 may be formed to be capable of storing the first and second removable memories 51 and 53 simultaneously.

The memory storage section 31 can store the two removable memories 51 and 53 as they are replaced with each other, but the constitution is not restricted to this, and three or more removable memories may be stored instead.

The two bodies 2 and 3 are connected by the connection device 5 in such a manner that it is possible to pivot them around the first and second axial lines L1 and L2 respectively, but there are no restrictions on this, it being necessary only that they are connected in such a manner that they can be rotated around at least the first axial line L1.

In the above embodiment, the operation section 7 is provided in the main face 2a of the first body 2, and the display section 15 is provided in the main face 3a of the second body 3; however, the constitution is not restricted to this, and the operation section may be provided in the main face 3a of the second body 3, and the display section provided in the main face 2a of the first body 2.

This invention is not restricted to the mobile telephone 1, and may be applied in any portable terminal device in which two bodies are connected by a connection device in such a way that they can be rotated, opened, and closed, such as a laptop computer or a PDA.

This invention is not restricted to the embodiment described above with reference to the drawings, and can be modified and the like in various ways without deviating from its main points.

As described above, according to the first aspect of this invention, when the two bodies are overlapped into the closed state, the memory storage section on the second body is covered and hidden by the first case, so that the removable memory can be easily prevented from falling out. Further, since the structure for keeping the removable memory inside the second body includes only a lid and the first body, increase in the thickness of the second body can be limited, enabling the portable terminal device to be made thinner.

The memory storage section is provided on another main face of the first body that is not visually confirmed when using the portable terminal device, so that, when the two bodies are overlapped into the closed state, the second body is covered and hidden by the first body, thereby maintaining a superior external design.

According to the second aspect of this invention, removable memories having a plurality of stipulations can be mounted in the portable terminal device, allowing data to be easily transmitted between the removable memory and another terminal device.

According to the third aspect of this invention, a plurality of storage sections, which store removable memories of different shapes and a plurality of stipulations, are formed to be mutually overlapping, whereby the capacity of the memory storage section can be reduced, enabling the portable terminal device to be made smaller.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A portable terminal device comprising:
a first body having an operation section on a main surface thereof;
a second body having a display section on a main surface thereof;
a connection device for connecting the first body and the second body so that the first body and the second body are openable and closable;
a memory storage section having an opening section openable to another main surface of the second body; and
a lid for opening and closing the opening section and retaining a removable memory in the memory storage section,
wherein the operation section is covered by the second body when the portable terminal device is in a closed state, and is exposed to the outside when the portable terminal device is in an open state,
the display section is exposed to the outside in either the closed or opened state, and
the lid is covered by the first body when the portable terminal device is in the closed state, and is exposed to the outside when the portable terminal is in the open state.

2. A portable terminal device according to claim 1, wherein the memory storage section comprises a plurality of storage spaces for respectively storing a plurality of types of removable memories having different shapes.

3. A portable terminal device according to claim 2, wherein at least one portion of the plurality of storage spaces is formed to be mutually overlapping.

4. A portable terminal device according to claim 1, wherein another main surface of the second body is flush with an outside surface of the lid when the opening section of the memory storage section is closed by the lid.

5. A portable terminal device according to claim 1, wherein the lid is inserted into and removed from the memory storage section by sliding the lid.

6. A portable terminal device according to claim 1, wherein the portable terminal device is a mobile radiotelephone.

7. A portable terminal device according to claim 1, wherein the portable terminal device is a personal digital assistant.

8. A portable terminal device according to claim 1, wherein the closed state is a state in which the first body and the second body are stacked one on the other,
the opened state is a state in which the operation section is exposed to the outside,
the connecting device includes an axial line along a direction in which the first and second bodies are stacked, and
the state of the portable terminal device is changed from the closed state to the opened state by rotating one of the first and second bodies with respect to the other about the axial line.

9. A portable terminal device according to claim 1, wherein the closed state is a state in which the first body and the second body are stacked one on the other,
the opened state is a state in which the operation section is exposed to the outside, and
the state of the portable terminal device is changed from the closed state to the opened state by sliding the second body with respect to the first body.

10. A portable terminal device comprising:
a first body having an operation section on a main surface thereof;
a second body having a display section on a main surface thereof;
a connection device for connecting the first body and the second body so that the first body and the second body are openable and closable;
a memory storage section having an opening section openable to another main surface of the second body; and
a lid for opening and closing the opening section and retaining a removable memory in the memory storage section,
wherein the operation section is coveted by the second body when the portable terminal device is in a closed state, and is exposed to the outside when the portable terminal device is in an open state,
the display section is exposed to the outside in either the closed or opened state, and
the another main surface of the second body is covered by the first body when the portable terminal device is in the closed state, and if exposed to the outside when the portable terminal device is in the opened state.

* * * * *